(12) United States Patent
Tanaka

(10) Patent No.: US 6,907,954 B2
(45) Date of Patent: Jun. 21, 2005

(54) THROTTLE SENSOR MOUNTING STRUCTURE

(75) Inventor: Makoto Tanaka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 182 days.

(21) Appl. No.: 10/385,699

(22) Filed: Mar. 12, 2003

(65) Prior Publication Data

US 2003/0217612 A1 Nov. 27, 2003

(30) Foreign Application Priority Data

Mar. 19, 2002 (JP) ........................................ 2002-076130

(51) Int. Cl.$^7$ .............................................. B62K 11/00
(52) U.S. Cl. ...................................... 180/335; 74/500.5
(58) Field of Search ................................ 180/335, 219, 180/220; 74/488, 489, 491, 500.5

(56) References Cited

U.S. PATENT DOCUMENTS

| | | | | |
|---|---|---|---|---|
| 4,740,905 A | * | 4/1988 | Murakami et al. | ............ 702/96 |
| 5,755,601 A | * | 5/1998 | Jones | ............ 440/1 |
| 5,881,833 A | * | 3/1999 | Branch et al. | ............ 180/179 |
| 6,218,804 B1 | * | 4/2001 | Toriyama et al. | ............ 320/104 |
| 6,600,411 B2 | * | 7/2003 | Nishimoto | ............ 340/432 |

* cited by examiner

Primary Examiner—David R. Dunn
(74) Attorney, Agent, or Firm—Birch, Stewart, Kolasch & Birch, LLP

(57) ABSTRACT

A throttle sensor mounting structure by which a throttle sensor can be mounted so that shock resistance thereof is enhanced and detection errors are reduced. Fork portions of a front fork are connected to each other at upper end portions thereof through a top bridge and on the lower side thereof through a bottom bridge. The opening of a throttle grip, i.e., the throttle opening is transmitted to a throttle sensor as a displacement of a throttle cable. The throttle sensor has its base member screwed to bosses provided at two positions on the front side of the top bridge by screws whereby it is so fixed that its major portion including a sensor portion is disposed between the top bridge and the bottom bridge.

18 Claims, 14 Drawing Sheets

THROTTLE SENSOR MOUNTING STRUCTURE

CROSS-REFERENCE TO RELATED APPLICATIONS

The present nonprovisional application claims priority under 35 USC 119 to Japanese Patent Application No. 2002-076130 filed on Mar. 19, 2002 the entire contents thereof is hereby incorporated by reference.

BACKGROUND OF THE INVENTION

1. Field of the Invention

The present invention relates to a throttle sensor mounting structure. More particularly, to a throttle sensor mounting structure suitable for a motor-driven vehicle in which a driving force is controlled according to the opening of a throttle grip.

2. Description of Background Art

In a motor-driven bicycle, a structure is know wherein the driving control is conducted based on the opening of a throttle grip in the same manner as in a conventional engine vehicle. In the motor-driven bicycle with such a structure, the throttle opening is detected by a potentiometer. The potentiometer is either incorporated in the throttle grip or fixed to a body frame as a throttle sensor.

In the structure in which the potentiometer is incorporated in the throttle grip, the opening of the throttle grip can be detected directly by the potentiometer. In the structure in which the throttle sensor such as a potentiometer is fixed to the body frame, the opening of the throttle grip is transmitted to the throttle sensor through a throttle cable, and the throttle opening is detected as a displacement amount of the throttle cable.

In the structure wherein the potentiometer is incorporated in the throttle grip, there is a technical problem so that it is necessary to provide the potentiometer with a rigid structure or to add a structural body for protecting the potentiometer, taking into account the shock exerted on the handle upon turn-over of the vehicle or the like.

In the structure in which the throttle sensor is fixed to the body frame, there is a technical problem so that it is necessary to provide the throttle cable with a play length in consideration for the case where the steering angle of the handle is large, with the result that the throttle cable is large in length.

SUMMARY AND OBJECTS OF THE INVENTION

It is an object of the present invention to provide a throttle sensor mounting structure wherein the above-mentioned problems in the prior art can be solved, and the throttle sensor can be so mounted that the shock resistance thereof is enhanced and detection errors can be reduced.

In order to attain the above object, the present invention is characterized by the provision of the following members:

A throttle grip is provided at one end of a handle with a throttle cable displaced according to the operations of the throttle grip, and a throttle sensor for detecting the displacement of the throttle cable wherein the throttle sensor is fixed to a portion steered according to the handle operations.

A front fork including a left-right pair of fork members, and a bridge means for connecting the pair of fork members to each other are provided, wherein the throttle sensor is fixed to the bridge means.

The bridge means includes a top bridge for connecting the pair of fork members to each other in the vicinity of the upper end portions thereof and a bottom bridge for connecting the pair of fork members to each other on the lower side of the top bridge wherein the throttle sensor is fixed to the top bridge and is disposed between the top bridge and the bottom bridge.

The bridge means includes a top bridge for connecting the pair of fork members to each other in the vicinity of upper end portions thereof, and a bottom bridge for connecting the pair of fork members to each other on the lower side of the top bridge, wherein a front side member is further provided between the top bridge and the bottom bridge and on the front side of a body, and the throttle sensor is disposed in the space surrounded by the top bridge, the bottom bridge and the front side member.

The front side member is a racing number plate, and the throttle sensor is fixed to the back surface of the racing number plate.

The front side member is a headlight, and the throttle sensor is fixed to the back surface of the headlight.

According to feature (1) above, not only is the degree of freedom in mounting the throttle sensor enhanced but also both the throttle grip and the throttle sensor are steered according to handle operations, so that it is unnecessary to provided the throttle cable with a play and it is possible to shorten the throttle cable.

According to the feature (2) above, the throttle sensor is fixed to the bridge means which is high in rigidity, so that it is possible to stably detect the throttle opening.

According to the feature (3) above, the top bridge prevents collision of an object flying from the upper side against the throttle sensor, and the bottom bridge prevents collision of an object flying from the lower side against the throttle sensor.

According to the feature (4) above, the collision of an object flying from the upper side against the throttle sensor is prevented by the top bridge, the collision of an object flying from the lower side against the throttle sensor is prevented by the bottom bridge, and the collision of an object flying from the front side against the throttle sensor is prevented by the front side member.

According to the feature (5) above, the racing number plate which is already present in a racing vehicle can be utilized as the front side member.

According to the feature (6) above, the headlight which is already present in a general vehicle can be utilized as the front side member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
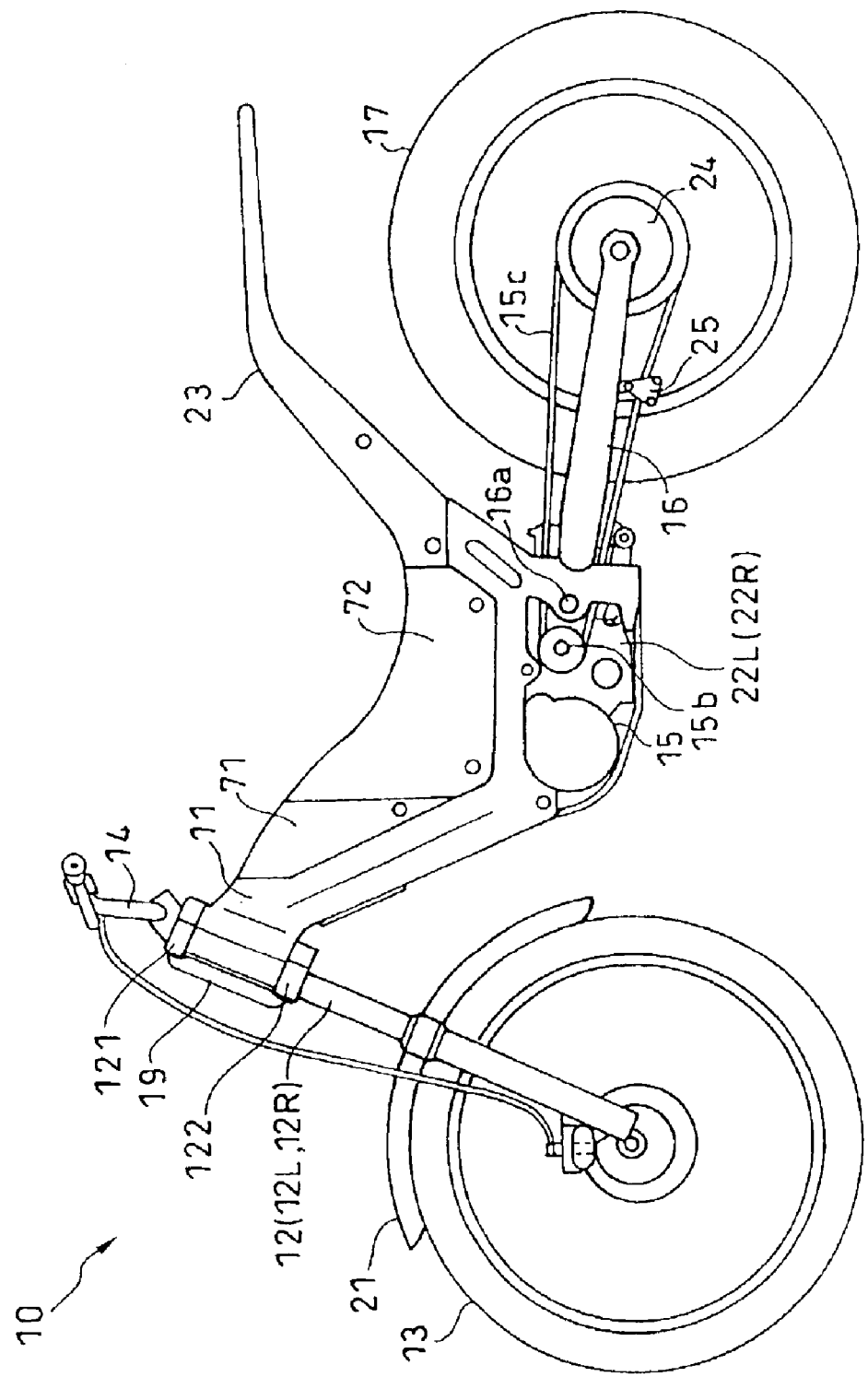
FIG. 1 is a side view of a motor-driven vehicle to which the present invention has been applied.

Now, a preferable mode for carrying out the present invention will be described in detail below, referring to the drawings. FIG. 1 is a side view of a motordriven vehicle to which the present invention has been applied, and, here, a trial bicycle will be described as an example.

The trial bicycle is a vehicle for a trial race in which a competition of the operating technique is conducted by utilizing or artificially providing a severe topography such as rocky roads, banks, slopes, etc. for each section. When the vehicle is driven by a motor, it is advantageous over an engine-driven vehicle from the viewpoints of exhaust gas and noise, and it is particularly suitable for use in a trial race indoors.

The motor-driven vehicle 10 has a structure in which a front fork 12 (comprised of a left-right pair of fork portions 12L and 12R) is steerably mounted onto a body frame 11 entirely made of an aluminum alloy. A front wheel 13 is mounted onto the lower ends of the front fork 12 with a bar handle 14 mounted onto the upper end of the front fork 12. An electric motor unit 15 is mounted on the lower side of the body frame 11. A left-right pair of pivot brackets 22L and 22R (the pivot bracket 22R on the depth side is not shown) are jointed to rear lower portions of the body frame 11 with a swing arm 16 vertically swingably mounted onto the pivot brackets 22L and 22R through a pivot shaft 16a. A rear wheel 17 is mounted onto the rear end of the swing arm 16.

Figure 2:
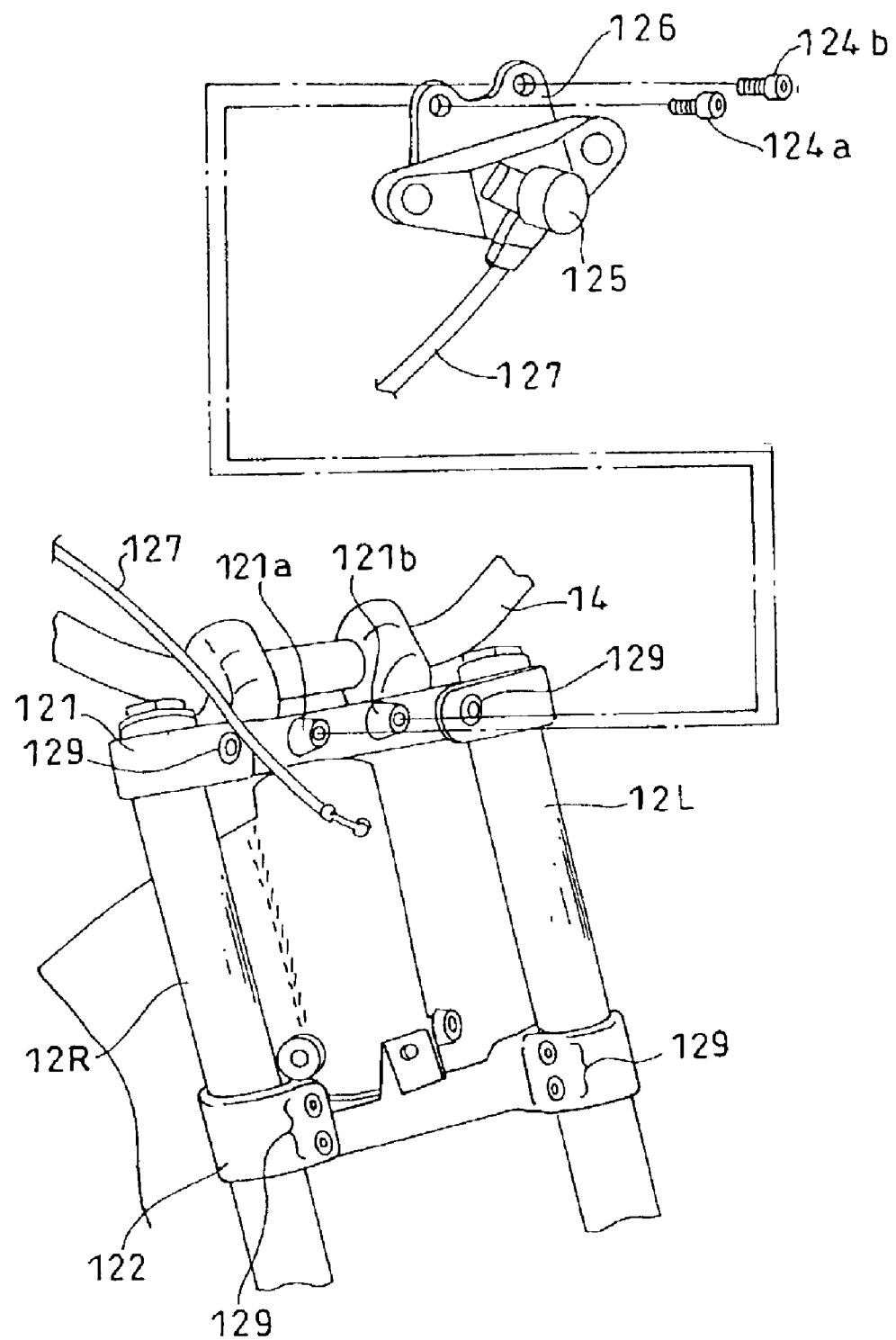
FIG. 2 is a view for illustrating the layout of a throttle sensor.

As shown in FIG. 2, the fork portions 12L and 12R of the front fork 12 are connected to each other at upper end portions thereof through a top bridge 121, and are connected to each other on the lower side through a bottom bridge 122. The bridges 121 and 122 are fastened to the fork portions 12L and 12R by split clamp bolts 129.

A throttle grip (not shown) is provided at an end portion of the handle 14. Since the bicycle according to the present invention is an electric motor-driven vehicle, it does not include a throttle. Therefore, there is no throttle grip as a means for regulating the opening of the throttle. However, for easy understanding of the functions of individual portions, the portions displaying the same functions as those in a gas powdered engine-driven vehicle will be described with the same words as those in the electric engine-driven vehicle of the present invention. The opening of the throttle grip, i.e., the throttle opening is transmitted to a throttle sensor 125 by a displacement of a throttle cable 127.

The throttle sensor 125 has its base member 126 screwed to bosses 121a and 121b provided at two positions on the front surface of the top bridge 121 by screws 124a and 124b, whereby it is fixed so that its major portion including a sensor portion is disposed between the top bridge 121 and the bottom bridge 122.

Incidentally, the trial bicycle according to the present invention is a racing vehicle, and a racing number plate 19 is so mounted so as to cover the space surrounded by the upper and lower bridges 121 and 122 and the pair of fork portions 12L and 12R from the front side, as shown in FIG. 1.

With such a construction, the top bridge 121 prevents the collision of an object flying from the upper side against the throttle sensor 125 and the bottom bridge 122 prevents the collision of an object flying from the lower side against the throttle sensor 125. Similarly, the racing number plate 19 prevents the collision of an object flying from the front side against the throttle sensor 125, so that breakage of the throttle sensor 125 due to a collision from a flying object can be prevented.

Figure 3:
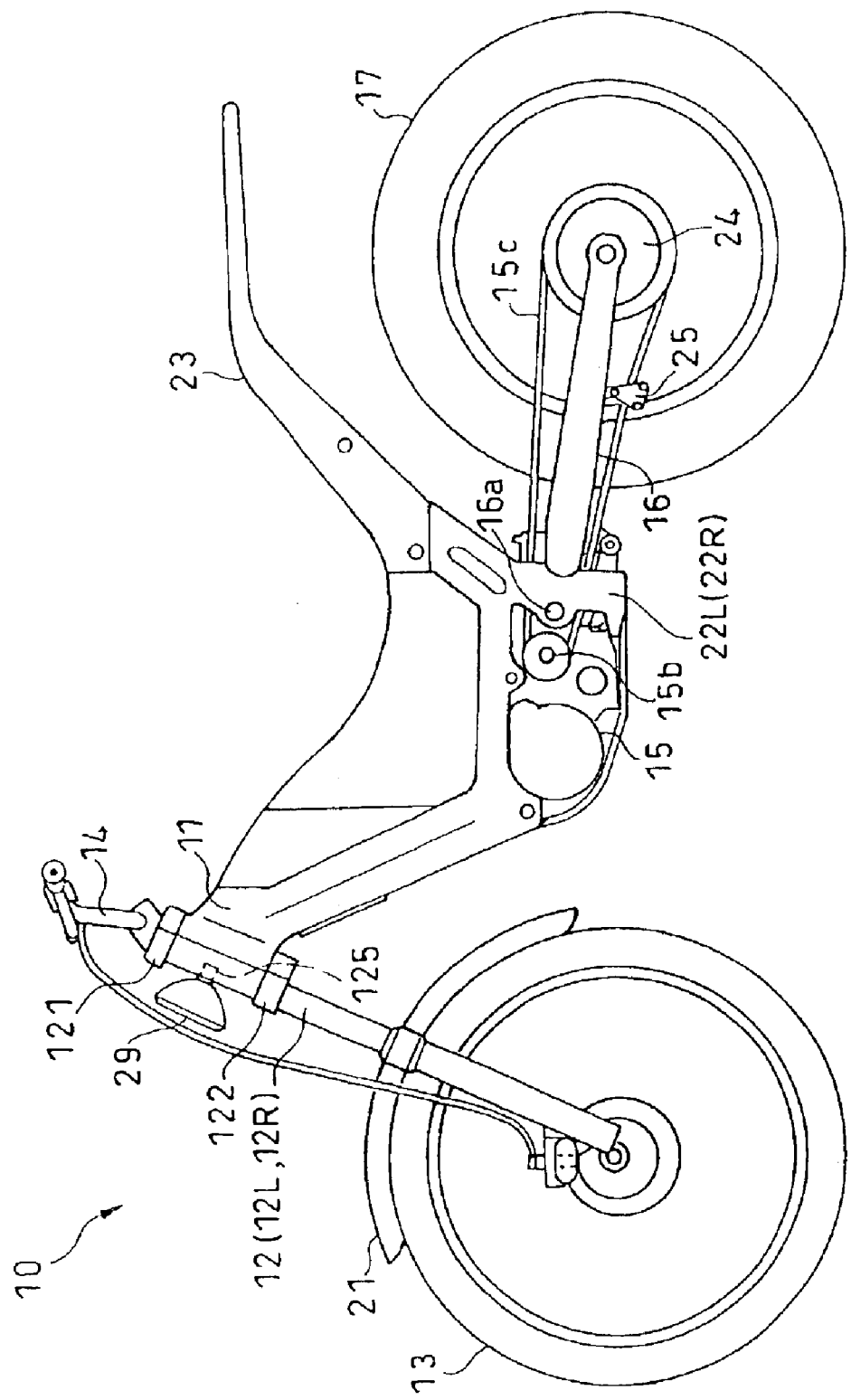
FIG. 3 is a view for illustrating another example of layout of the throttle sensor.

Incidentally, the mounting position of the throttle sensor 125 is not limited to the above-mentioned. In the case of a general vehicle including a headlight in place of the racing number plate 19, the throttle sensor 125 may be mounted onto the back surface of the headlight 29, as shown in FIG. 3.

With such a constitution, again, the top bridge 121 prevents the collision of an object flying from the upper side, such as small stones and water drops, against the throttle sensor 125 and the collision of an object flying from the lower side against the throttle sensor 125 is prevented by the bottom bridge 122. Similarly, the collision of an object flying from the front side against the throttle sensor 125 is prevented by the headlight 29, so that breakage of the throttle sensor 125 due to collision thereon of a flying object can be prevented.

Returning to FIG. 1, an output sprocket 15b of the electric motor unit 15 is connected to a driven sprocket 24 of the rear wheel 17 through an endless chain 15c. The displacement of the chain 15c is restricted by a chain guide 25. The upper side of the front wheel 13 is covered with a front fender 21, and the upper side of the rear wheel 17 is covered with a rear fender 23.

Figure 4:
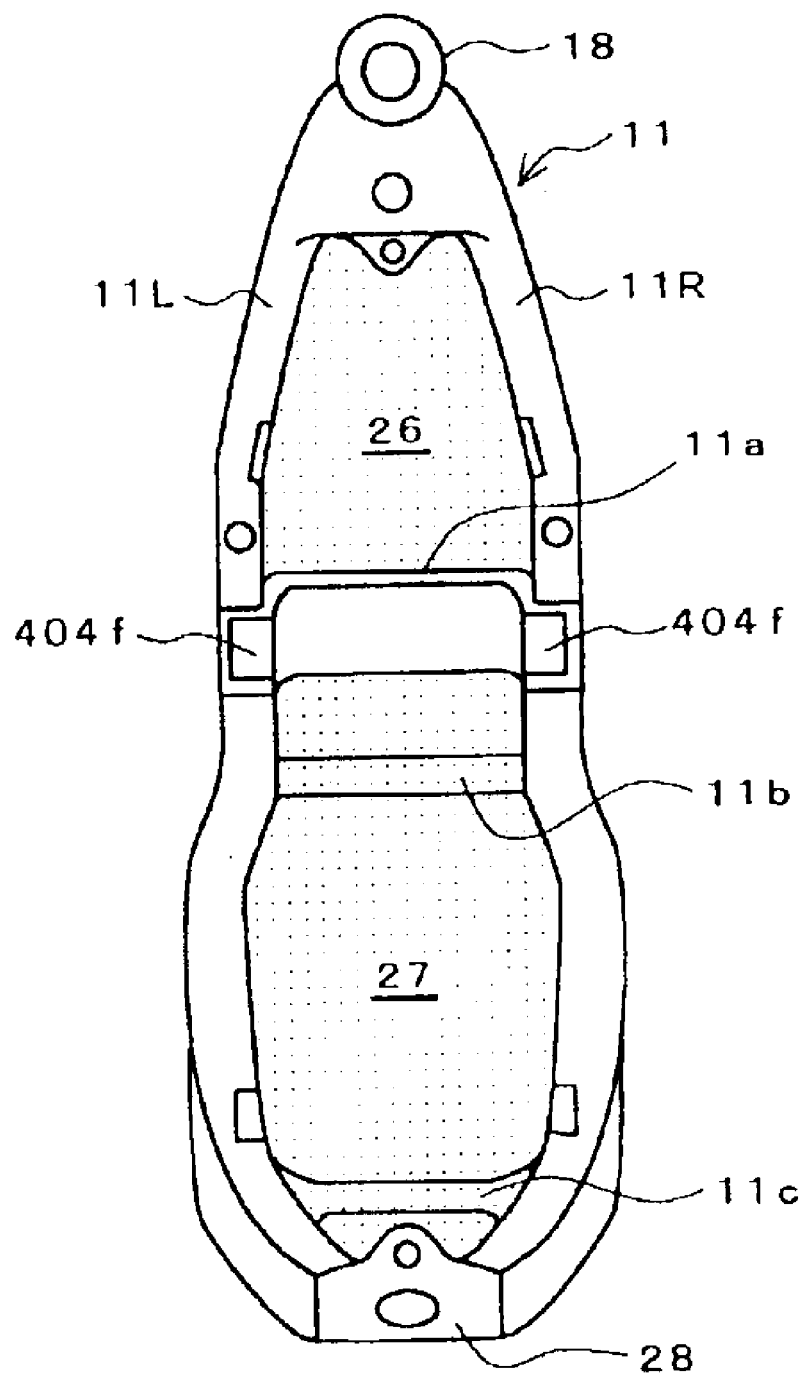
FIG. 4 is a view of a body frame from the upper side.

FIG. 4 is a view of the body frame 11 from the upper side, in which the same symbols as those in the above denote the same or equivalent portions.

The body frame 11 has a left-right pair of center frames 11L and 11R as main components, of which front end portions are connected to each other through a head pipe 18, and rear end portions are connected to each other through a rear stay 28. The center frames 11L and 11R are further connected to each other in the range from the front ends thereof to the rear ends thereof by three bridge frames 11*a*, 11*b* and 11*c*.

Figure 5:
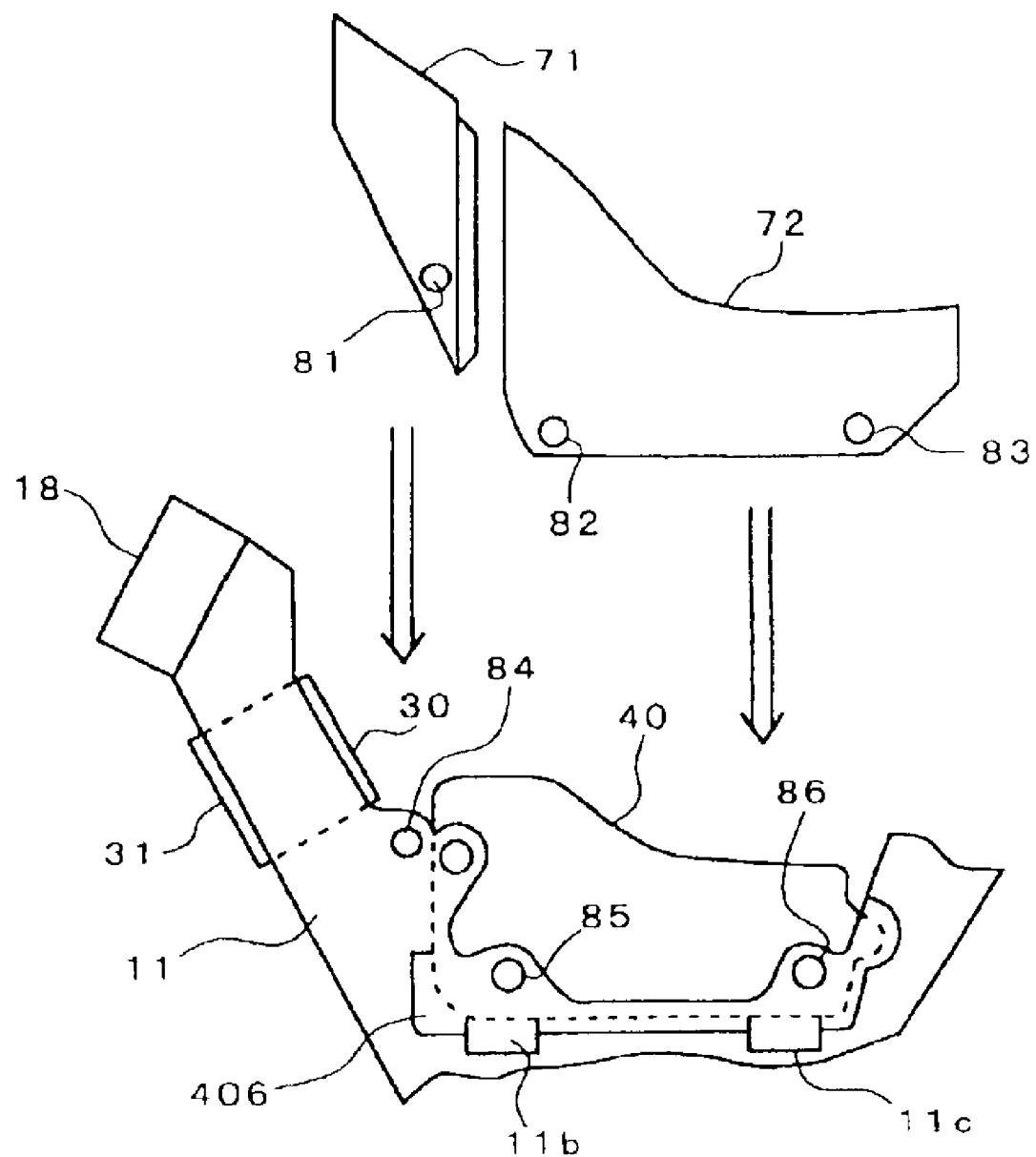
FIG. 5 is a side view of the body frame in the condition where a battery is mounted thereon.

As shown in FIGS. 4 and 5, the body frame 11 includes a front opening 26 surrounded by the center frames 11L and 11R, the head pipe 18 and the bridge frame 11*a*. A rear opening 27 is surrounded by the center frames 11L and 11R, the rear stay 28 and the bridge frame 11*a*. A control circuit unit 30 is contained in the front opening 26 so that it can be attached and detached on the upper side.

A battery 40 is contained in the rear opening 27 so that it can be attached and detached on the upper side. The control circuit unit 30 is covered with a unit cover 71 from the upper side with the battery 40 being covered with a battery cover 72 from the upper side and screw-fixed to tapping holes 84, 85 and 86 of the body frame 11 at opening portions 81, 82 and 83, respectively.

Figure 6:
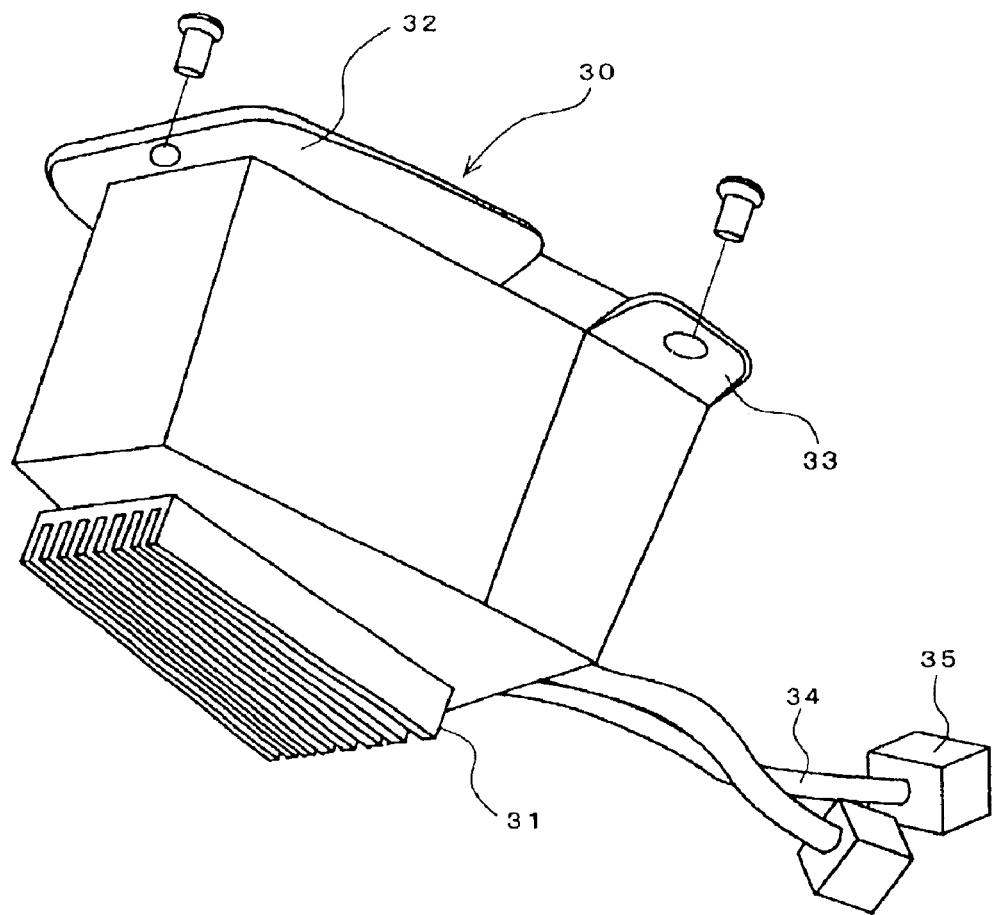
FIG. 6 is a perspective view of a control circuit unit from a bottom portion.
Figure 7:
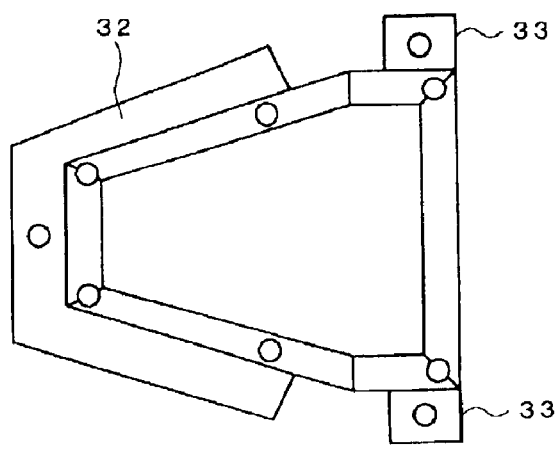
FIG. 7 is a top plan view of the control circuit unit.

FIG. 6 is a perspective view of the control circuit unit 30 from a bottom portion, and FIG. 7 is a top plan view of the same.

The control circuit unit 30 is a tetragonal column having a roughly trapezoid projection shape, in conformity with the inner peripheral shape of the front opening 26 of the body frame 11, and a heat sink 31 is provided at a bottom portion thereof. The control circuit unit 30 is so mounted that at least the heat sink 31 is exposed from a lower portion of the body frame 11, as shown in FIG. 5. A coupler 35 is attached to the tip end of a signal line 34 extending from the control circuit unit 30.

Three flange portions 32, 33 and 33 are also provided at the upper surface of the control circuit unit 30, as shown in FIG. 7. When the control circuit unit 30 is contained in the front opening 26, the flange portions are brought into contact with the upper surface of the body frame 11 and are thereby restricted in the vertical position. The control circuit unit 30 is screwed to the body frame 11 at openings provided in the flanges 32, 33 and 33.

Figure 8:
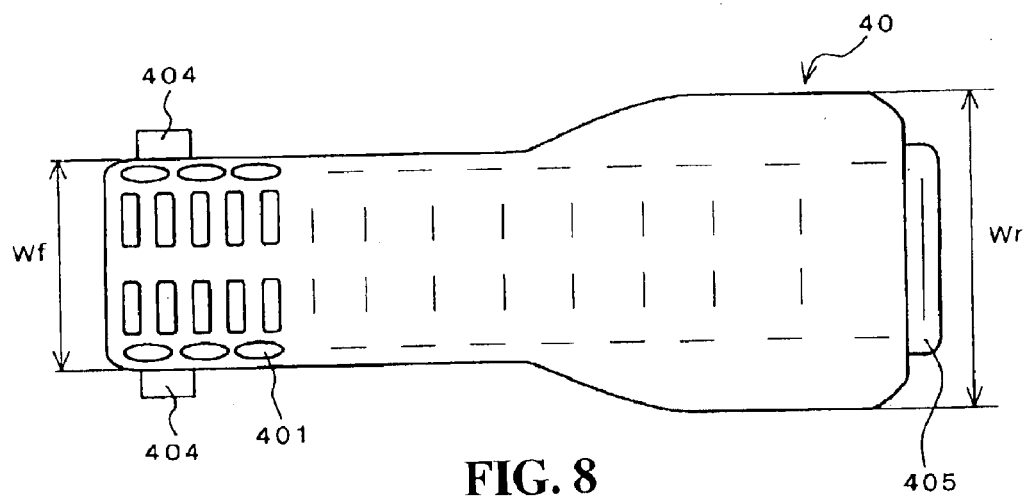
FIG. 8 is a top view of the battery.
Figure 9:
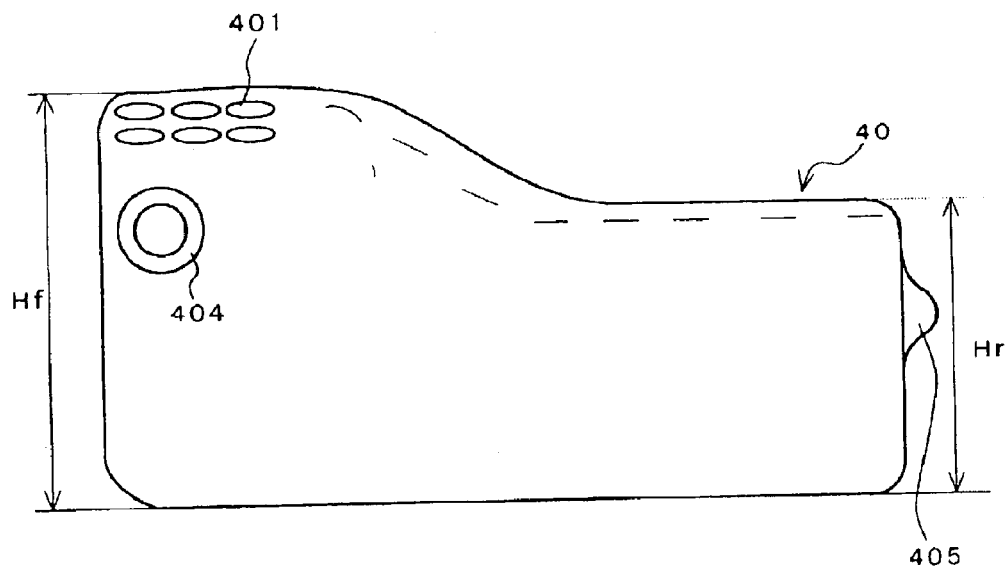
FIG. 9 is a side view of the battery.
Figure 10:
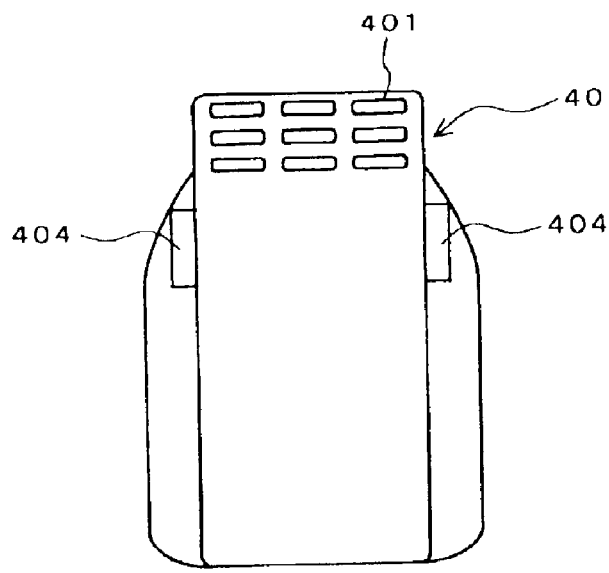
FIG. 10 is a front view of the battery.
Figure 11:
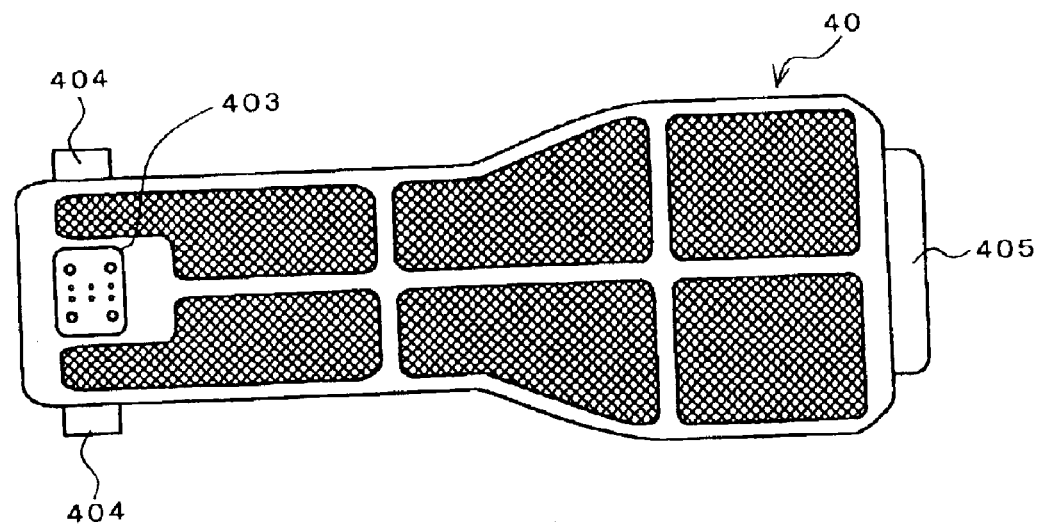
FIG. 11 is a bottom view of the battery.

FIG. 8 is a top view of the battery 40 contained in the rear opening 27, FIG. 9 is a side view of the same, FIG. 10 is a front view of the same, and FIG. 11 is a bottom view of the same.

The battery 40 has a rear portion width Wr in a state of being mounted on the vehicle which is larger than the width Wf of other portions than the rear portion. A rear portion height Hr is smaller than a front portion height Hf. The top surface of the battery 40 is provided with a multiplicity of vent ports 401, and the opposed bottom surface is provided with mesh form openings, as shown in FIG. 11. Projections 404 for fixing the battery to the body frame 11 are provided on the front side of side surfaces of the battery 40, and a projection 405 for fixing the battery to a battery tray 406 which will be described later is formed at the rear surface of the battery 40.

Figure 12:
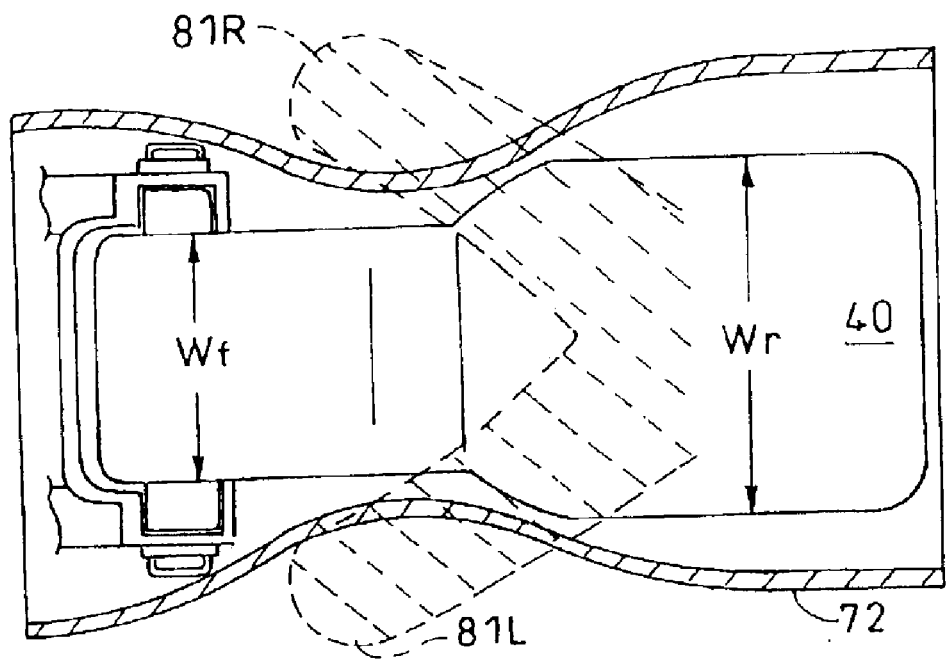
FIG. 12 is a horizontal sectional view of a battery cover.

Thus, in the present mode, the width W of the battery in relation to the operating direction is smaller at other portions than the rear portion (Wf) than at the rear portion (Wr). Therefore, as shown in FIG. 12, the projection shape of the battery cover 72, i.e., the body shape at this portion can be an hourglass shape having a recessed portion between the front portion and the rear portion along the operating direction. Therefore, the knee-grip, i.e., the gripping of the body by both knees 81L and 81R of the driver is facilitated.

Figure 13:
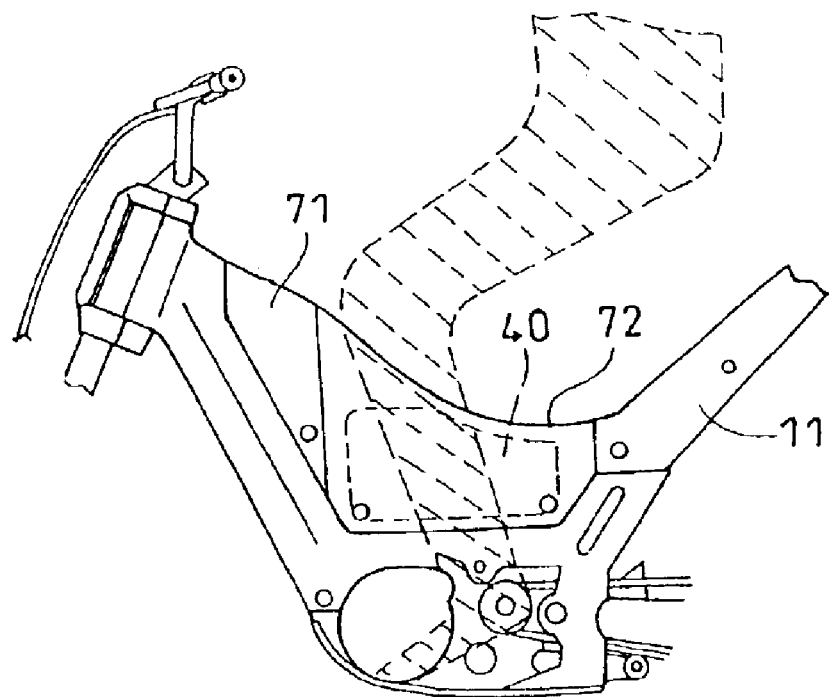
FIG. 13 is a side view of the battery cover.

Further, in the present mode, since the height H of the battery is smaller at the rear portion (Hr) than at the front portion (Hf), as shown in FIG. 13, the body height at the position of the rear portion of the battery cover 72 can be reduced without spoiling the battery capacity, with the result that the easiness of riding astride the vehicle and the easiness of racing are enhanced.

Figure 14:
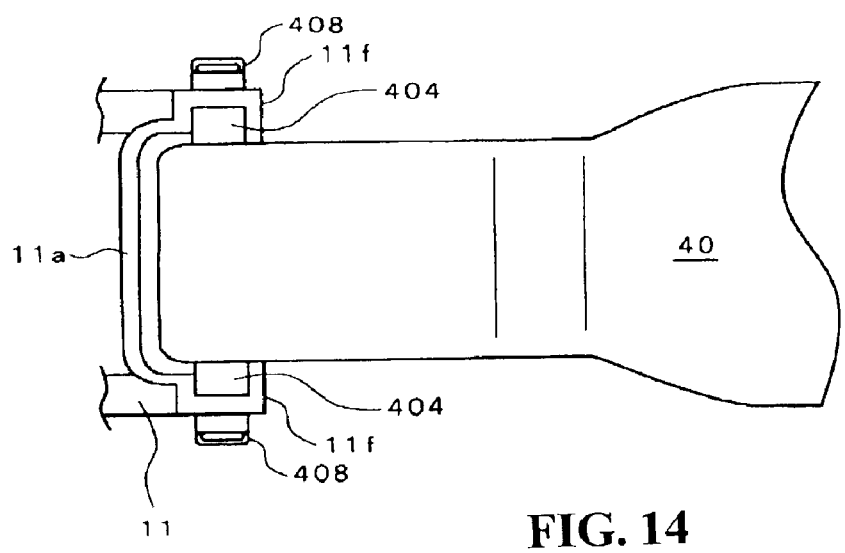
FIG. 14 is a top view showing the method of fixing the battery.
Figure 15:
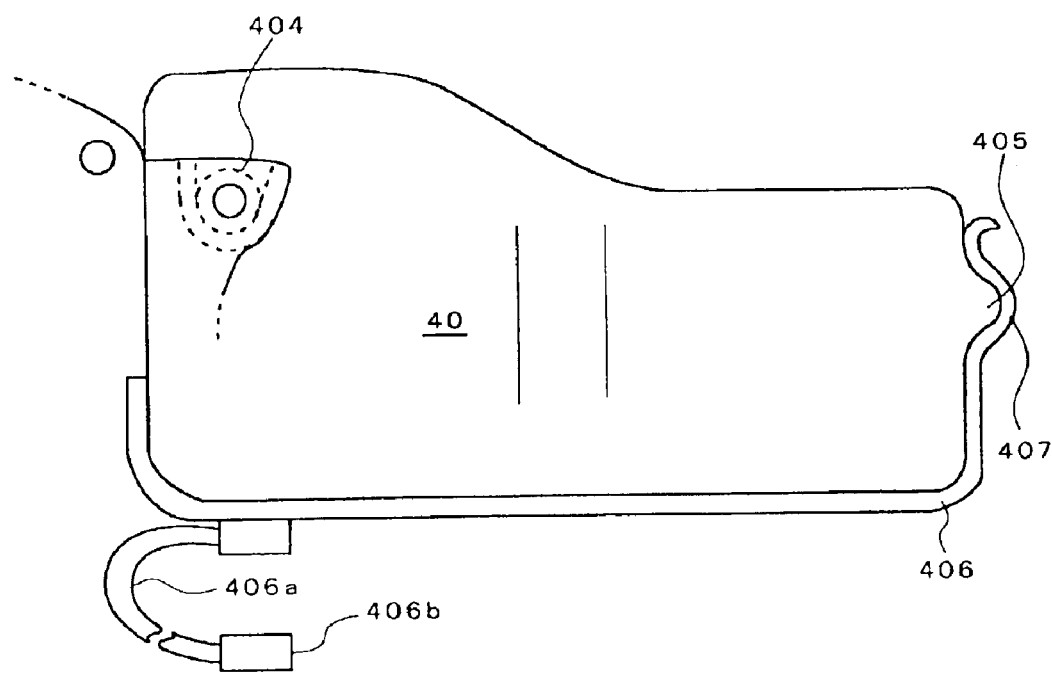
FIG. 15 is a side view showing the method of fixing the battery.

FIGS. 14 and 15 show the method of fixing the battery 40. A resin-made battery tray 406 is fixed onto the two bridges 11*b* and 11*c* of the body frame 11. A hook plate 407 is raised at a rear portion of the battery tray 406, and a connection cable 406*a* for connecting the battery 40 to the control unit 30 and a coupler 406*b* therefore are provided at the bottom surface of the battery tray 406.

The battery 40 is so contained that the projection 405 at the rear surface thereof is engaged with the hook plate 407, and the projections 404, 404 provided at left and right side surfaces on the front side thereof are contained in projection receivers 11*f* of the bridge 11*a*. Pins 408 inserted from side surfaces of the projection receivers 11*f* are passed through the left and right projections 404 of the battery 40, whereby the projections 404 are prevented from slipping off from the projection receivers 11*f*.

Figure 16:
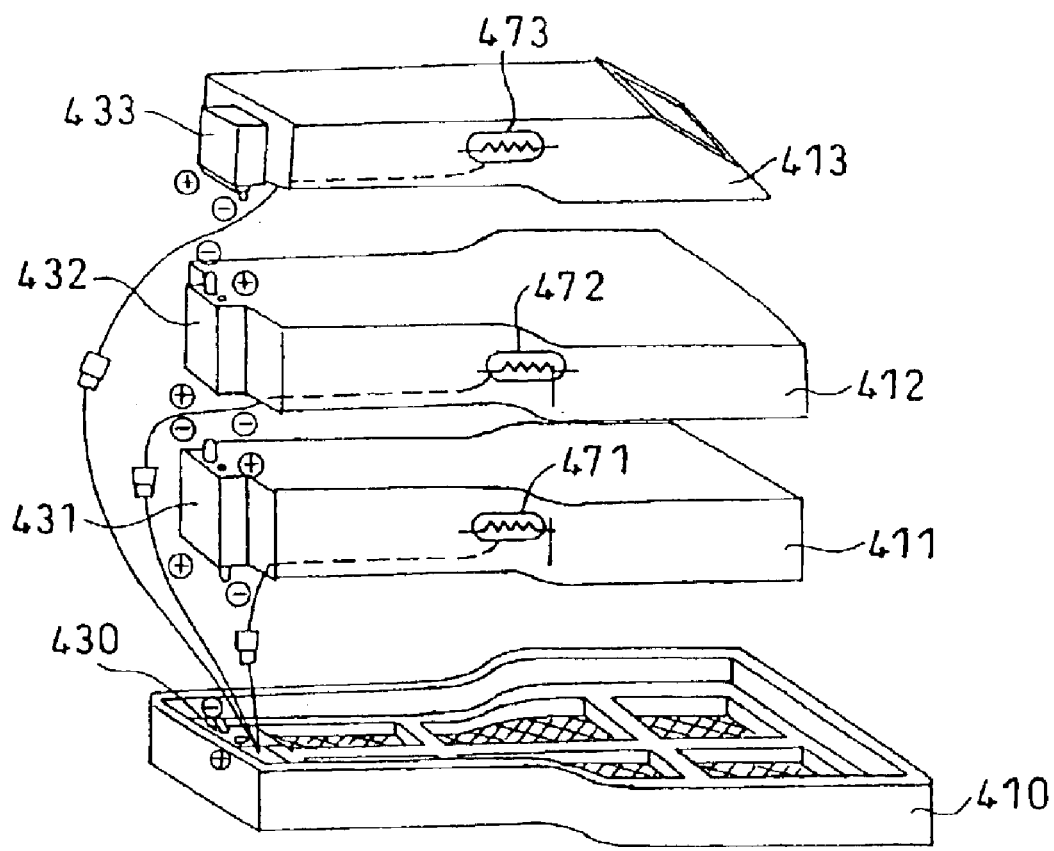
FIG. 16 is a development showing the internal structure of the battery.

FIG. 16 is a development showing the internal structure of the battery 40, in which the same symbols as above denote the same or equivalent portions.

Figure 17:
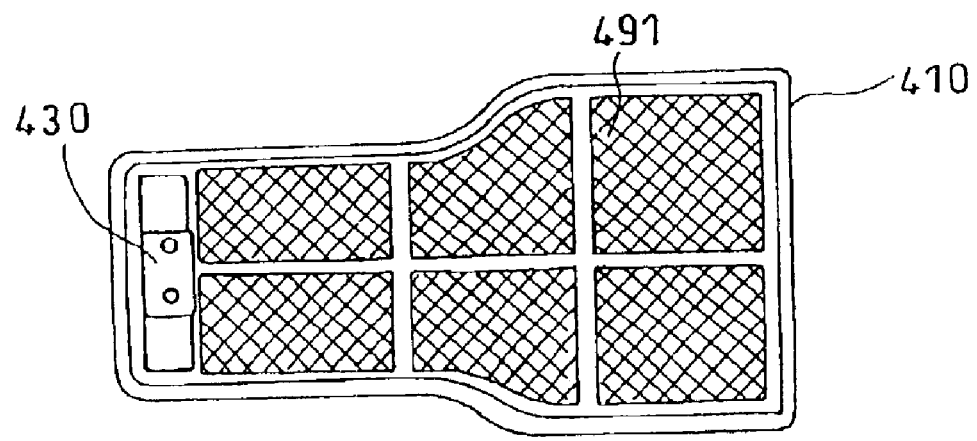
FIG. 17 is a plan view of a cell tray.

Stacking three cell trays 411, 412 and 413 for containing battery cells on a base tray 410 constitutes the battery 40 according to the present mode. In each of the cell trays 411, 412 and 413, a multiplicity of battery cells are contained in a rising posture or an inverted posture. As typically shown in FIG. 17, each of the cell trays 411, 412 and 413 and the base tray 410 is provided with mesh form vent ports 491 in the bottom surface thereof, and is provided with a connector 430 (which will be described later) at one end thereof.

Figure 18:
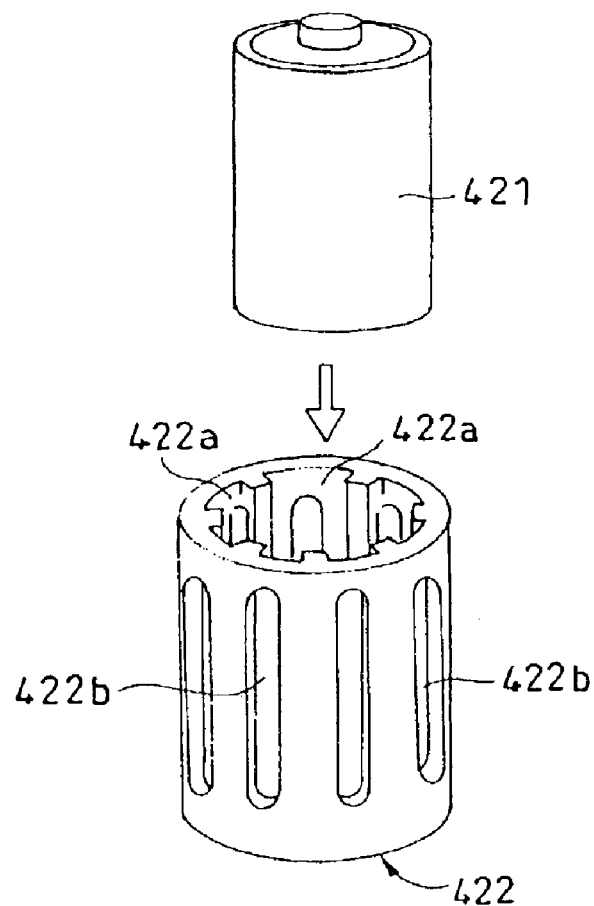
FIG. 18 is a perspective view showing the structure of a cell cover.
Figure 19:
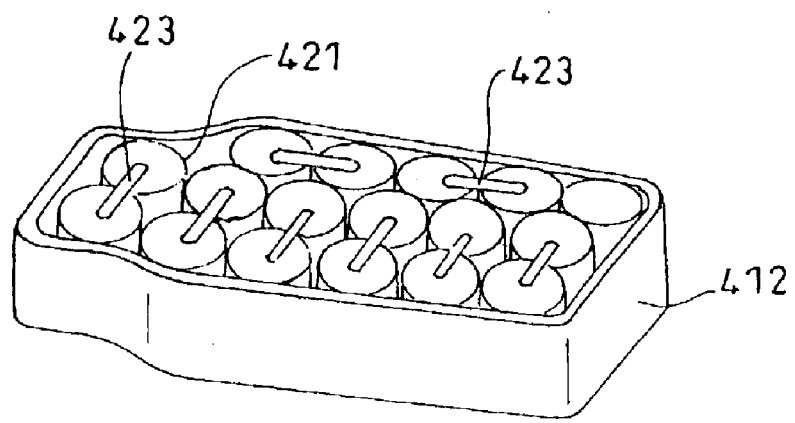
FIG. 19 is a view showing the method of connecting the battery cells.

FIGS. 18 and 19 show the method of containing the battery cells in each of the cell trays 411, 412 and 413. The method of containing the battery cells in the cell tray 412 will be described as an example.

As shown in FIG. 18, each battery cell 421 is fitted with a tubular cell cover 422. The inner peripheral surface of the cell cover 422 is provided with a multiplicity of vent passages 422*a* in the longitudinal direction, and the side surface of the cell cover 422 is provided with longitudinal slits 422*b* in conformity with the vent passages 422*a*.

The battery cells 421 fitted with the cell covers 422 are contained in the cell tray 412 in a rising posture or in an inverted posture, as shown in FIG. 19. The positive poles of the battery cells in the rising posture are connected with the negative poles of the battery cells in the inverted posture through bridge electrodes 423, and the negative poles of the battery cells in the rising posture are connected with the positive poles of the battery cells in the inverted posture through the bridge electrodes 423, whereby all the battery cells 421 are connected in series. The electrodes of each battery cell 421 and the bridge electrodes are jointed electrically and physically by spot welding (resistance welding or laser welding or the like), for example.

Returning to FIGS. 16 and 17, connectors 430, 431, 432 and 433 are provided at end portions of the cell trays 411, 412 and 413 and the base tray 410, and a positive pole line and a negative pole line of the battery cells 421 connected in series as above-mentioned are connected to a positive electrode and a negative electrode, respectively.

The connectors 430, 431, 432 and 433 are connected in series by stacking the trays 410, 411, 412 and 413 in their normal posture. The connector 430 of the base tray 410 leads out one end (positive pole) and the other end (negative pole)

of the series connection to the backside. Temperature sensors (for example, thermistors) 471, 472 and 473 are mounted in the vicinity of central portions of the cell trays 411, 412 and 413, and signal lines of the temperature sensors 471, 472 and 473 are also led out to the back side through the connector 430 of the base tray 410. The cell trays 411, 412 and 413 and the base tray 410 are covered with a battery case which is not shown.

When the battery 40 is mounted on the battery tray 406, the electrode exposed to the back side (bottom side) of the base tray 410 is connected to the control unit 30 through the connection cable 406a and the coupler 406b of the battery tray 406, as shown in FIG. 15.

Figure 20:
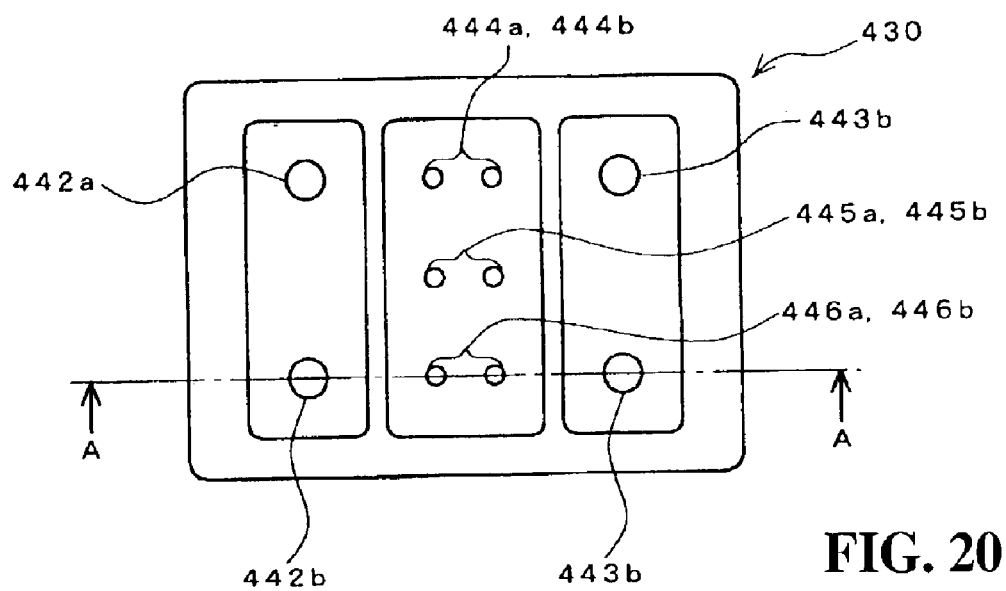
FIG. 20 is a plan view of a base tray connector.
Figure 21:
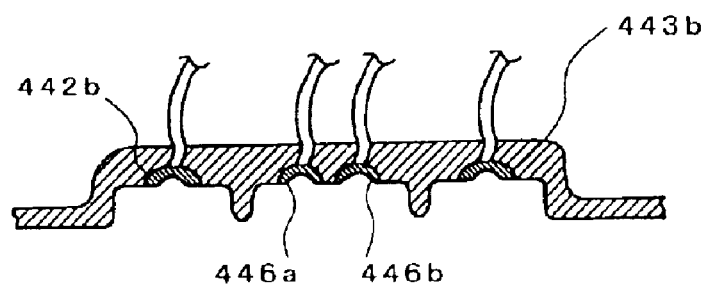
FIG. 21 is a sectional view of the base tray connector.

FIG. 20 is a plan view of the connector 430 exposed to the back side of the base tray 410, and FIG. 21 is a sectional view of a major part of the same.

The connector 430 comprises two positive pole contacts 442a and 442b, two negative pole contacts 443a and 443b and six temperature sensor contacts 444a, 444b, 445a, 445b, 446a and 446b.

In the present mode, two positive pole contacts and two negative pole contacts are provided, to thereby contrive prevention of contact failure or the like. A signal line of the temperature sensor 471 provided on the battery plate 411 is connected to the temperature sensor contacts 444a and 444b. A signal line of the temperature sensor 472 provided on the battery plate 412 is connected to the temperature sensor contacts 445a and 445b. A signal line of the temperature sensor 473 provided on the battery plate 413 is connected to the temperature sensor contacts 446a and 446b.

Figure 22:
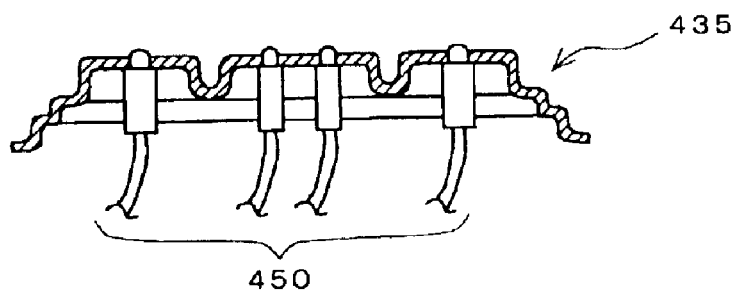
FIG. 22 is a sectional view of a battery tray connector.

FIG. 22 is a sectional view showing the constitution of a major portion of the connector 435 provided on the side of the battery tray 406 with spring pins 450 being provided in correspondence with each of the contacts on the battery side.

In this manner, in the present mode, the battery electrodes and external contacts are set in elastic contact with each other by the spring pins, so that favorable conduction is always secured.

Figure 23:
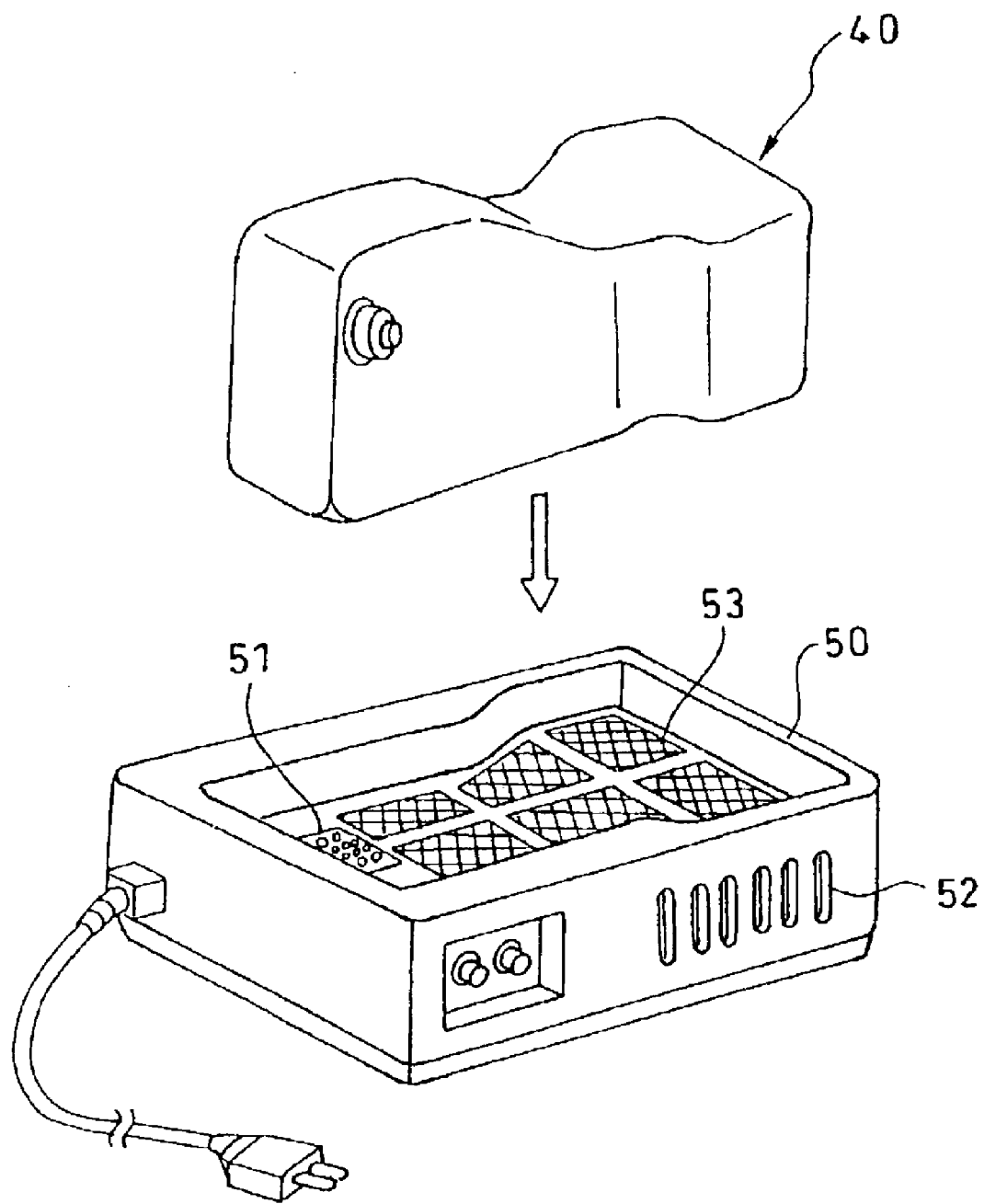
FIG. 23 is a perspective view for illustrating a charging structure of the battery.

FIG. 23 is a perspective view for illustrating the charging structure of the battery 40 described above, in which the same symbols as above denote the same or equivalent portions.

A battery charger 50 includes a battery mount surface 53 recessed in conformity with the bottom surface shape of the battery 40. The mount surface 53 is provided with a charging connector 51 at a position corresponding to the connector 430 of the battery 40. Therefore, an electrical connection between the battery 40 and the battery charger 50 is secured by only mounting the battery 40 on the mount surface 53. The battery charger 50 transforms a commercial power source of AC 100 V into a DC voltage conforming to the battery voltage, and supplies a charging current to the battery 40.

A major portion of the battery mount surface 53 is opened in a mesh form, so that when an air cooling fan (not shown) provided inside is rotated, outside air is taken in through an intake port 52 and is blown through the battery mount surface 53. The air blown passes through meshes 491 provided at bottom portions of the base tray 410 and the cell trays 411, 412 and 413 of the battery 40 and through the vent passages secured between the side surface of each battery cell 421 and the cell cover 422, and passes through the vent port 401 at the upper portion of the battery to the exterior of the battery.

According to the present carrying-out mode, the battery mount surface 53 of the battery charger 50 is constructed in a mesh form with the cooling fan being provided on the lower side thereof so as to blow air upwards from the battery mount surface during charging, so that the battery being charged can be cooled efficiently.

Furthermore, in the present mode, the vent ports are provided at upper and lower surfaces of the battery 40 and bottom portions of the cell trays and the base tray, and vent passages are secured at side surfaces of the battery cells, so that the battery can be further cooled efficiently.

According to the present invention, the following effects can be attained.

The degree of freedom in mounting the throttle sensor is enhanced. In addition, since the throttle grip and the throttle sensor are both steered according to the handle operations, it is unnecessary to provide the throttle cable with a play, and the throttle cable can be shortened.

Since the throttle sensor is fixed to the bridge means which is high in rigidity, it is possible to achieve stable detection of the throttle opening.

Since the top bridge prevents the collision of an object flying from the upper side against the throttle sensor and the bottom bridge prevents the collision of an object flying from the lower side against the throttle sensor, breakage of the throttle sensor due to the collision thereon of a flying object is prevented.

Since the collision of an object flying from the upper side against the throttle sensor is prevented by the top bridge, the collision of an object flying from the lower side against the throttle sensor is prevented by the bottom bridge and the collision of an object flying from the front side against the throttle sensor is prevented by the front side member, breakage of the throttle sensor due to the collision thereon of a flying object is prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A throttle sensor mounting structure comprising:
   a throttle grip provided at one end of a handle;
   a throttle cable displaced according to operations of said throttle grip;
   a throttle sensor for detecting the displacement of said throttle cable;
   a front fork comprising a left-right pair of fork members; and
   a bridge means for connecting said pair of fork members to each other, wherein said throttle sensor is fixed to said bridge means,
   wherein said throttle sensor is fixed to a portion steered according to handle operations.

2. The throttle sensor mounting structure according to claim 1, wherein said bridge means comprises:
   a top bridge for connecting said pair of fork members to each other in the vicinity of upper end portions thereof, and
   a bottom bridge for connecting said pair of fork members to each other on the lower side of said top bridge, wherein said throttle sensor is fixed to said top bridge and is disposed between said top bridge and said bottom bridge.

3. The throttle sensor mounting structure according to claim 1, wherein said bridge means comprises:

a top bridge for connecting said pair of fork members to each other in the vicinity of upper end portions thereof, and a bottom bridge for connecting said pair of fork members to each other on the lower side of said top bridge, wherein a front side member is further provided between said top bridge and said bottom bridge and on the front side of the vehicle body, and said throttle sensor is disposed in the space surrounded by said top bridge, said bottom bridge and said front side member.

4. The throttle sensor mounting structure according to claim 3, wherein said front side member is a racing number plate and said throttle sensor is fixed to the back surface of said racing number plate.

5. The throttle sensor mounting structure according to claim 3, wherein said front side member is a headlight, and said throttle sensor is fixed to the back surface of said headlight.

6. The throttle sensor mounting structure according to claim 1, wherein the throttle sensor includes a base member screwed to bosses provided at two positions on the front surface of a top bridge, whereby the throttle sensor is fixed so that a sensor portion is disposed between the top bridge and a bottom bridge.

7. A sensor mounting structure for controlling the operation of a vehicle comprising:

a grip provided at one end of a handle;

a cable displaced according to operations of said grip; and a sensor for detecting the displacement of said cable;

a front fork comprising a left-right pair of fork members, and a bridge means for connecting said pair of fork members to each other, wherein said sensor is fixed to said bridge means, wherein said sensor is fixed to a portion steered according to handle operations.

8. The sensor mounting structure for controlling the operation of a vehicle according to claim 7, wherein said bridge means comprises:

a top bridge for connecting said pair of fork members to each other in the vicinity of upper end portions thereof, and a bottom bridge for connecting said pair of fork members to each other on the lower side of said top bridge, wherein said sensor is fixed to said top bridge and is disposed between said top bridge and said bottom bridge.

9. The sensor mounting structure for controlling the operation of a vehicle according to claim 7, wherein said bridge means comprises:

a top bridge for connecting said pair of fork members to each other in the vicinity of upper end portions thereof, and a bottom bridge for connecting said pair of fork members to each other on the lower side of said top bridge, wherein a front side member is further provided between said top bridge and said bottom bridge and on the front side of the vehicle body, and said sensor is disposed in the space surrounded by said top bridge, said bottom bridge and said front side member.

10. The sensor mounting structure for controlling the operation of a vehicle according to claim 9, wherein said front side member is a racing number plate and said sensor is fixed to the back surface of said racing number plate.

11. The sensor mounting structure for controlling the operation of a vehicle according to claim 9, wherein said front side member is a headlight, and said sensor is fixed to the back surface of said headlight.

12. The throttle sensor mounting structure according to claim 7, wherein the throttle sensor includes a base member screwed to bosses provided at two positions on the front surface of a top bridge, whereby the throttle sensor is fixed so that a sensor portion is disposed between the top bridge and a bottom bridge.

13. A sensor mounting structure for controlling the operation of a vehicle comprising:

a grip provided at one end of a handle, said grip including a movable portion for controlling the operation of a motor for the vehicle;

a cable operatively connected to said movable portion of said grip, said cable being displaced according to rotation of said movable portion;

a sensor for detecting the displacement of said cable a front fork comprising a left-right pair of fork members; and a bridge means for connecting said pair of fork members to each other, wherein said sensor is fixed to said bridge means wherein said sensor is fixed to a portion of a steering mechanism of the vehicle.

14. The sensor mounting structure for controlling the operation of a vehicle according to claim 13, wherein said bridge means comprises:

a top bridge for connecting said pair of fork members to each other in the vicinity of upper end portions thereof, and a bottom bridge for connecting said pair of fork members to each other on the lower side of said top bridge, wherein said sensor is fixed to said top bridge and is disposed between said top bridge and said bottom bridge.

15. The sensor mounting structure for controlling the operation of a vehicle according to claim 13, wherein said bridge means comprises:

a top bridge for connecting said pair of fork members to each other in the vicinity of upper end portions thereof, and a bottom bridge for connecting said pair of fork members to each other on the lower side of said top bridge, wherein a front side member is further provided between said top bridge and said bottom bridge and on the front side of the vehicle body, and said sensor is disposed in the space surrounded by said top bridge, said bottom bridge and said front side member.

16. The sensor mounting structure for controlling the operation of a vehicle according to claim 15, wherein said front side member is a racing number plate and said sensor is fixed to the back surface of said racing number plate.

17. The sensor mounting structure for controlling the operation of a vehicle according to claim 15, wherein said front side member is a headlight, and said sensor is fixed to the back surface of said headlight.

18. The throttle sensor mounting structure according to claim 13, wherein the throttle sensor includes a base member screwed to bosses provided at two positions on the front surface of a top bridge, whereby the throttle sensor is fixed so that a sensor portion is disposed between the top bridge and a bottom bridge.

* * * * *